Feb. 23, 1943.     W. DIETERLE     2,312,153
SENSITIZING OF SILVER HALIDE EMULSIONS
Filed May 7, 1940
Fig.1 Unsensitized Silver Chloride Emulsion
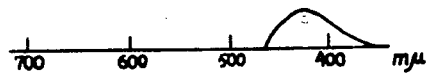
Fig.2 Silver Chloride Emulsion Sensitized with the Dye of Example II
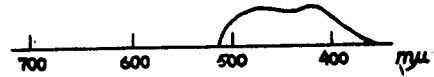
Fig.3 Silver Chloride Emulsion Sensitized with the Dye of Example III
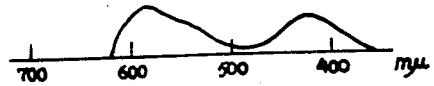
Walter Dieterle
INVENTOR.
BY
HIS ATTORNEYS Patented Feb. 23, 1943

2,312,153

UNITED STATES PATENT OFFICE 2,312,153

SENSITIZING OF SILVER HALIDE EMULSIONS

Walter Dieterle, Dessau-Ziebigk, Germany, assignor to General Aniline & Film Corporation, New York, N. Y., a corporation of Delaware Application May 7, 1940, Serial No. 333,761
In Germany May 15, 1939

4 Claims. (Cl. 95—7)

This invention relates to sensitizing of silver halide emulsions.

The use of sensitizers especially for silver chloride and silver chloro bromide emulsions obtainable by condensation of diamines or triamines with ω-aldehydes of heterocyclic nitrogen compounds is described in U. S. Patent No. 2,155,475.

It is an object of this invention to provide new and useful sensitizing dyes for photographic silver halide emulsions.

A further object is the provision of sensitizers showing slight coloring properties of the binding agent of the photographic emulsion.

Further objects will become apparent from the detailed specification following hereinafter.

It has been found that within this group such sensitizers possess especially valuable properties which are derived from aromatic diamines or triamines containing in whatever position, i. e. in the aromatic nucleus (or nuclei) or in the amino group (or amino groups) one or several carboxyl groups or sulfo acid groups. The most important and progressive quality of these sensitizers is their slight coloring property of the binding agent of the photographic emulsion or of the paper support in the case of photographic papers. Furthermore the sensitizing intensity is very often increased by the introduction of these acid groups.

The dyestuffs are incorporated into the emulsion itself in the usual manner or by bathing into the emulsion layer. The dyestuffs, naturally, may also be used in mixture with each other or together with sensitizers of other groups. The manufacture of the dyestuffs is accomplished according to U. S. Patent No. 2,155,459.

The invention is illustrated by the accompanying self-explanatory drawing, depicting the sensitivities of silver halide emulsions sensitized with the dyes of Examples II and III, especially when taken with the following examples.

*Example I*

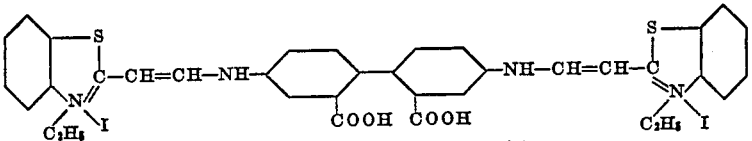

Sensitizing maximum at 505 mμ.

*Example II*

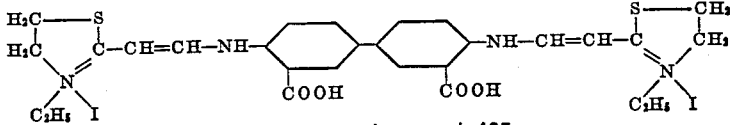

Sensitizing maximum at 485 mμ.

*Example III*

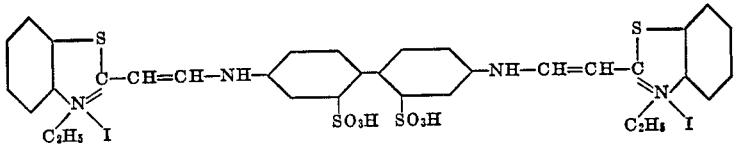

Sensitizing maximum at 470–475 mμ.

*Example IV*

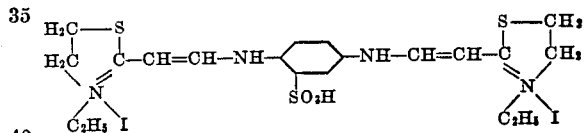

Sensitizing maximum at 480 mμ.

*Example V*

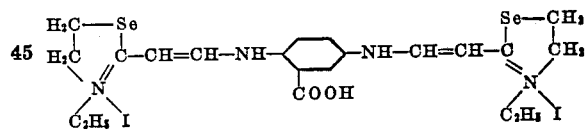

Sensitizing maximum at 495 mμ.

*Example VI*

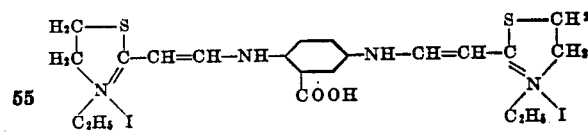

Sensitizing maximum at 490 mμ.

Example VII

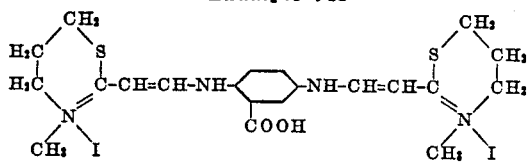

Sensitizing maximum at 490–495 mμ.

Example VIII

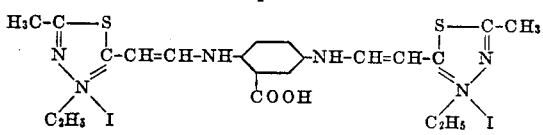

Sensitizing maximum at 515 mμ.

Example IX

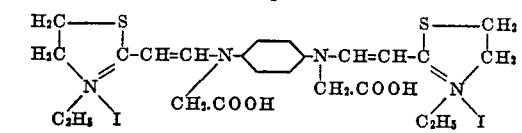

Sensitizing maximum at 485 mμ.

Example X

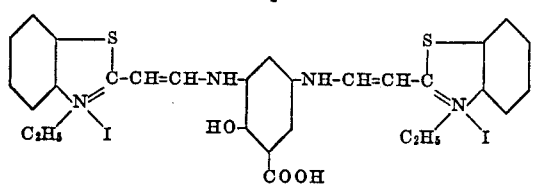

Sensitizing maximum at 500 mμ.

Example XI

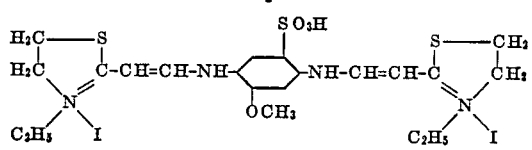

Sensitizing maximum at 480–485 mμ.

Example XII

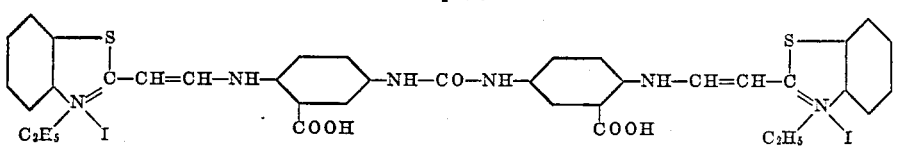

Sensitizing maximum at 500 mμ.

What I claim is:

1. A silver halide emulsion containing as a sensitizing dyestuff therefor, compounds of the following formula:

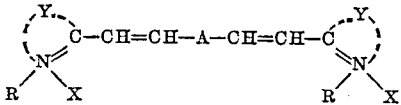

in which A is an aromatic radicle containing at least 1 benzene nucleus but not more than 2 benzene nuclei and being linked to each of the adjacent CH— groups by a nitrogen atom, said radicle containing at least 1 group selected from the class consisting of carboxyl and sulfonic acid groups, Y represents the atoms necessary to complete a heterocyclic ring system, R is alkyl and X is an anion.

2. A silver halide emulsion containing a dyestuff corresponding to the following formula:

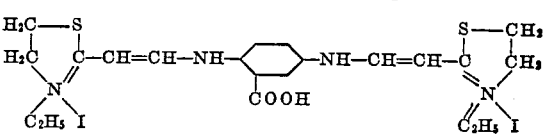

3. A silver halide emulsion containing a dyestuff corresponding to the following formula:

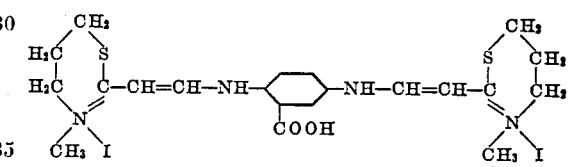

4. A silver halide emulsion containing a dyestuff corresponding to the following formula:

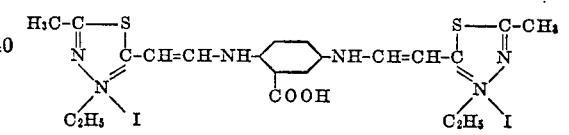

WALTER DIETERLE.